DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 15, 1972

901 O.G. 778

T901,031
PROCESS FOR RECOVERING FIBERS
Malak E. Yunan, 3421 Rockfield Drive, Wilmington, Del. 19810
Filed Aug. 26, 1971, Ser. No. 175,356
Int. Cl. C08f *47/08;* C08g *53/22*
U.S. Cl. 260—2.5 N
No Drawing. 10 Pages Specification

Process for recovering individual, inflated, microcellular staple fibers from a group of such fibers which are bonded together with a thermoplastic adhesive. The process includes heating the group of bonded fibers to a temperature above which the adhesive softens but below the melting point of the polymer from which the fibers are made, agitating the group of fibers to separate them from each other, and cooling the separated fibers. The separated fibers may then be reused, along with freshly made inflated, microcellular staple fibers, for making pneumacel fiber batts.